United States Patent
Le Saux et al.

(10) Patent No.: US 10,481,950 B2
(45) Date of Patent: Nov. 19, 2019

(54) METHOD OF OPERATING FEATURES OF A COMMUNICATION DEVICE AND RELATED COMMUNICATION DEVICE VIA MAPPINGS OF FEATURES WITH CORRESPONDING VIRTUAL MACHINES AND HARDWARE COMPONENTS

(75) Inventors: Louis-Marie Le Saux, Paris (FR); Lorenzo Saino, Mortara (IT); Elise Vennegues, Sainte-Agnes (FR)

(73) Assignee: ORANGE, Paris (FR)

( * ) Notice: Subject to any disclaimer, the term of this patent is extended or adjusted under 35 U.S.C. 154(b) by 33 days.

(21) Appl. No.: 13/990,659

(22) PCT Filed: Nov. 28, 2011

(86) PCT No.: PCT/EP2011/071193
§ 371 (c)(1),
(2), (4) Date: May 30, 2013

(87) PCT Pub. No.: WO2012/072585
PCT Pub. Date: Jun. 7, 2012

(65) Prior Publication Data
US 2013/0247048 A1    Sep. 19, 2013

(30) Foreign Application Priority Data

Nov. 30, 2010 (EP) ..................... 10306324

(51) Int. Cl.
*G06F 9/455* (2018.01)
*G06F 9/46* (2006.01)
(Continued)

(52) U.S. Cl.
CPC .............. *G06F 9/50* (2013.01); *G06F 1/3203* (2013.01); *G06F 1/3212* (2013.01);
(Continued)

(58) Field of Classification Search
CPC .... G06F 1/3287; G06F 9/5094; G06F 1/3203; G06F 1/3228; G06F 1/3231; Y02B 60/1203; Y02B 60/142
See application file for complete search history.

(56) References Cited

U.S. PATENT DOCUMENTS

| | | | | |
|---|---|---|---|---|
| 5,452,461 A | * | 9/1995 | Umekita | ................... G06F 8/45 717/146 |
| 6,253,224 B1 | * | 6/2001 | Brice, Jr. | ............ G06F 9/45558 711/208 |

(Continued)

FOREIGN PATENT DOCUMENTS

| | | |
|---|---|---|
| EP | 1914620 A2 | 4/2008 |
| EP | 2071458 A1 | 6/2009 |

OTHER PUBLICATIONS

International Search Report and Written Opinion dated Dec. 27, 2011 for corresponding International Application No. PCT/EP2011/071193, filed Nov. 28, 2011.

(Continued)

*Primary Examiner* — Emerson C Puente
*Assistant Examiner* — Zhi Chen
(74) *Attorney, Agent, or Firm* — David D. Brush; Westman, Champlin & Koehler, P.A.

(57) ABSTRACT

A method is provided for operating a communication device offering a plurality of features by a plurality of virtual machines, which run on a virtualized representation of a plurality of hardware components. The method includes: obtaining a mapping between at least some features of the plurality of features and corresponding sets of virtual machines of the plurality of virtual machines and hardware components of the plurality of hardware components which are required to enable the features; and upon deciding to activate or deactivate at least one group of features of the plurality of features, switching on or off virtual machines of (Continued)

the plurality of virtual machines and hardware components of the plurality of hardware components depending on the mapping.

6 Claims, 3 Drawing Sheets

(51) Int. Cl.
   *G06F 9/50* (2006.01)
   *G06F 1/3203* (2019.01)
   *G06F 1/3212* (2019.01)

(52) U.S. Cl.
   CPC ........ *G06F 9/45533* (2013.01); *G06F 9/5077* (2013.01); *G06F 9/5094* (2013.01); *Y02D 10/174* (2018.01); *Y02D 10/22* (2018.01); *Y02D 10/26* (2018.01); *Y02D 10/28* (2018.01); *Y02D 10/36* (2018.01)

(56) References Cited

U.S. PATENT DOCUMENTS

| | | | | |
|---|---|---|---|---|
| 7,356,679 | B1* | 4/2008 | Le et al. | 713/1 |
| 7,949,008 | B2* | 5/2011 | Armstrong | G06F 21/53 |
| | | | | 370/328 |
| 8,156,378 | B1* | 4/2012 | Suit | G06F 11/0709 |
| | | | | 714/26 |
| 8,286,174 | B1* | 10/2012 | Schmidt | G06F 9/5077 |
| | | | | 709/226 |
| 8,856,782 | B2* | 10/2014 | Ghosh | G06F 9/45533 |
| | | | | 718/1 |
| 2007/0204166 | A1* | 8/2007 | Tome | H04L 63/0272 |
| | | | | 713/182 |
| 2007/0220291 | A1 | 9/2007 | Stufflebeam | |
| 2008/0182630 | A1* | 7/2008 | Parks et al. | 455/574 |
| 2008/0276299 | A1 | 11/2008 | Lee et al. | |
| 2008/0294920 | A1* | 11/2008 | Hatasaki et al. | 713/323 |
| 2010/0115049 | A1* | 5/2010 | Matsunaga | G06F 3/0626 |
| | | | | 709/216 |
| 2011/0010691 | A1* | 1/2011 | Lu | G06F 11/3688 |
| | | | | 717/124 |
| 2011/0029652 | A1* | 2/2011 | Chhuor et al. | 709/223 |
| 2011/0047541 | A1* | 2/2011 | Yamaguchi | G06F 9/45558 |
| | | | | 718/1 |
| 2011/0161695 | A1* | 6/2011 | Okita et al. | 713/310 |
| 2011/0184991 | A1* | 7/2011 | Matsuda | H04L 41/069 |
| | | | | 707/792 |
| 2011/0239020 | A1* | 9/2011 | Thomas | G06F 1/3203 |
| | | | | 713/323 |
| 2012/0005521 | A1* | 1/2012 | Droux et al. | 714/4.11 |
| 2012/0054750 | A1* | 3/2012 | Saripalli | 718/100 |

OTHER PUBLICATIONS

Yoo et al., MobiVMM: "A Virtual Machine Monitor for Mobile Phones", MobiVirt 2008 Breckenridge, CO, USA.

* cited by examiner

METHOD OF OPERATING FEATURES OF A COMMUNICATION DEVICE AND RELATED COMMUNICATION DEVICE VIA MAPPINGS OF FEATURES WITH CORRESPONDING VIRTUAL MACHINES AND HARDWARE COMPONENTS

CROSS-REFERENCE TO RELATED APPLICATIONS

This Application is a Section 371 National Stage Application of International Application No. PCT/EP2011/071193, filed Nov. 28, 2011, which is incorporated by reference in its entirety and published as WO 2012/072585, on Jun. 7, 2012, in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present invention relates to the operation of a communication device offering a plurality of features by means of a plurality of virtual machines which run on a virtualized representation of a plurality of hardware components.

BACKGROUND OF THE DISCLOSURE

Over last years, the average capabilities of communication devices, such as mobile devices, have dramatically increased. As a result, nowadays, most of the communication devices available in the market are capable of providing a large set of features, i.e. functionalities, in addition to traditional core telephony features. For instance, devices are now capable of recording and playing a plurality of media formats, taking pictures and providing navigation services.

However, the introduction of all these features on mobile devices or other types of communication devices has led to a considerable increase in their power consumption, which may result in shorter battery autonomy. In fact, firstly, such features require communication devices' software to execute more complex and computation-hungry tasks, hence generating more computation load for CPU and central memory. Secondly, they generally require a higher amount of network communication to exchange data with remote application servers, thus resulting in a higher utilisation of network interfaces. Thirdly, the use of these features involves the utilisation of a larger number of power-consuming hardware components, such as GPS receivers, Bluetooth and Wi-Fi transceivers, high-resolution screens, cameras, etc.

Hardware virtualization has been proposed as a solution for rationalising power consumption on communication devices. In this context, hardware virtualization is intended as the organization of a plurality of features in a plurality of virtual machines which run on a virtualized representation of physical hardware resources (components) provided by a hypervisor (sometimes referred to as Virtual Machine Monitor (VMM)).

To do so, as shown in FIG. 2, a virtualization layer 4, installed on top of the communication device hardware 3, abstracts this hardware in order to present it to several virtual machines 5 installed on top of it. This is in contrast with the classical communication device 1 of FIG. 1, in which the hardware components 2 are all presented as such to the device, with no virtualization operation.

In this context, with the term "virtual machine" it is intended a system virtual machine, which, as known in the art, refers to any self sufficient software stack, which may comprise an operating system and a plurality of processes, which can be run on top of a virtualization layer. For instance, machines running operating systems like Android™ or Symbian Platform™ would be defined as virtual machines if executed on top of a virtualization layer.

However, as those skilled in the art would recognize, a virtual machine would generally consume more energy to execute a specific task in comparison to a physical machine. In fact, in order to successfully run virtual machines on physical hardware, it is required to operate a hypervisor which adds a computational overhead to all tasks performed by virtual machines running on top of it. Nonetheless, recent advancements in virtualization technologies have strongly reduced the average overhead of hypervisors to a negligible level in most cases.

In addition, virtualization can provide energy efficiency by enabling to freeze the status of unutilized or scarcely utilized virtual machines when, for example, residual battery autonomy downward crosses a predefined threshold. This feature also allows to securely shut down virtual machines and to restore the exact status in which they were at the moment of being shut down, once adequate energy autonomy is available.

Another alternative known technique for reducing power consumption consists in shutting down non-critical hardware components in case of inadequate energy autonomy. Examples of the application of this technique include shutting down non-critical network interfaces such as Wi-Fi and Bluetooth or reducing the brightness of screen.

The techniques described above present at least the following major shortcoming.

Disabling hardware components or virtual machines does not systematically enable to identify what exact features will not be available any longer after such operations, except in trivial cases. In fact, for example, in environments comprising a large plurality of virtual machines whereby the availability of any singular feature may rely upon a plurality of intercommunicating virtual machines and hardware components, any operation on hardware components or virtual machines may leave the system in an inconsistent state.

SUMMARY

In order to alleviate this situation at least in part, the invention proposes a method of operating a communication device offering a plurality of features by means of a plurality of virtual machines which run on a virtualized representation of a plurality of hardware components. The method comprises:

obtaining a mapping between at least some features of said plurality of features and corresponding sets of virtual machines of said plurality of virtual machines and hardware components of said plurality of hardware components which are required to enable said features;

upon deciding to activate or deactivate at least one group of features (i.e. one or several features) of said plurality of features, switching on or off virtual machines of said plurality of virtual machines and hardware components of said plurality of hardware components depending on said mapping.

So, the invention is based on a feature-oriented representation of virtual machines and hardware components.

Thus, the features that should be discontinued or kept inactive and the features that should become or remain active are first selected. Subsequently, the relevant virtual machines and hardware components are switched on or off to implement this policy. This offers a better quality of user experience, as consistent state for the system can be ensured.

According to advantageous embodiments that may be combined in any possible way:

- upon deciding to deactivate a first group of features of said plurality of features, switching off the virtual machines of said plurality of virtual machines and the hardware components of said plurality of hardware components which, according to said mapping, are required to enable the features of said first group of features but are not required to enable the features of said plurality of features which are not part of said first group of features. In this way, power saving can take place on the communication device with no side-effect on the user experience, since other features are not impacted by the switch off of those VMs and HWs;
- upon deciding to activate only a second group of features of said plurality of features, switching off the virtual machines of said plurality of virtual machines and the hardware components of said plurality of hardware components which, according to said mapping, are not required to enable the features of said second group of features. In this way, power saving can take place on the communication device with no side-effect on the user experience, since the features out of said second group of features are inactive;
- deciding to activate or deactivate at least one group of features of said plurality of features occurs when at least one criterion is satisfied; this gives more flexibility as to the time when feature activation/deactivation and thus VMs/HWs switch on/off can take place;
- said criterion is based on at least one of: a user input on the communication device, a remaining power level on the communication device, an actual use of at least one group of features of said plurality of features; such criteria each offer respective flexibility;
- obtaining said mapping comprises, with respect to at least one feature, obtaining one corresponding set of virtual machines of said plurality of virtual machines and one corresponding set of hardware components of said plurality of hardware components which are required to enable said at least one feature. The sets can consist in a common set of both virtual machines and hardware components including the relations therebetween, which constitutes useful information. Alternatively, two separate sets may be used for the virtual machines and hardware components respectively, which may reduce the complexity of calculations required to identify required virtual machines and hardware components in order to enable determined features;
- said set of virtual machines and said set of hardware components are derived from a table representing the relations between the virtual machines of said plurality of virtual machines and the hardware components of said plurality of hardware components which are required to enable said at least one feature. This is advantageous, especially in case the table is available to the communication device beforehand.

the above-mentioned method further comprises:
- obtaining a current state table representing a current on or off state of all virtual machines of said plurality of virtual machines and all hardware components of said plurality of hardware components;
- upon deciding to activate or deactivate at least one group of features of said plurality of features, deriving from said mapping a state template representing a target on or off state of all the virtual machines of said plurality of virtual machines and all the hardware components of said plurality of hardware components; and
- switching on or off virtual machines of said plurality of virtual machines and hardware components of said plurality of hardware components depending on a comparison between the current state table and the state template. This use of a "mask" that can be applied to a current state situation may facilitate the identification of the VMs and HWs to be switched on or off.

The invention also proposes a communication device capable of operating according to the above-mentioned method. The communication device is arranged for offering a plurality of features by means of a plurality of virtual machines which run on a virtualized representation of a plurality of hardware components, and comprises:
- a unit for obtaining a mapping between at least some features of said plurality of features and corresponding sets of virtual machines of said plurality of virtual machines and hardware components of said plurality of hardware components which are required to enable said features;
- a unit for, upon deciding to activate or deactivate at least one group of features of said plurality of features, switching on or off virtual machines of said plurality of virtual machines and hardware components of said plurality of hardware components depending on said mapping.

The invention also proposes a computer program product comprising code instructions for operating a communication device offering a plurality of features by means of a plurality of virtual machines which run on a virtualized representation of a plurality of hardware components according to the above-mentioned method, when loaded and run on said communication device.

BRIEF DESCRIPTION OF THE DRAWINGS

The preferred features of the above aspects which are indicated by the dependent claims may be combined as appropriate, and may be combined with any of the above aspects of the invention, as would be apparent to a person skilled in the art.

DETAILED DESCRIPTION OF ILLUSTRATIVE EMBODIMENTS

Figure 1:
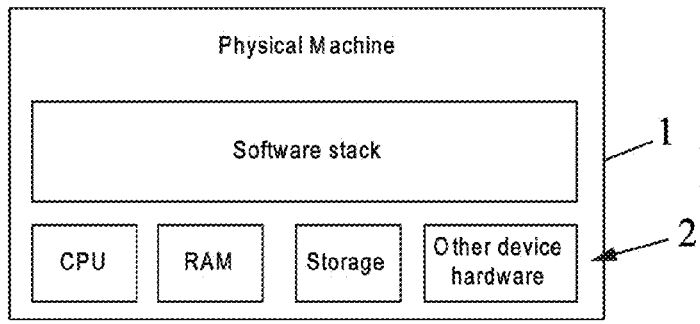
FIG. 1, already discussed, schematically shows a conventional architecture for a communication device.
Figure 2:
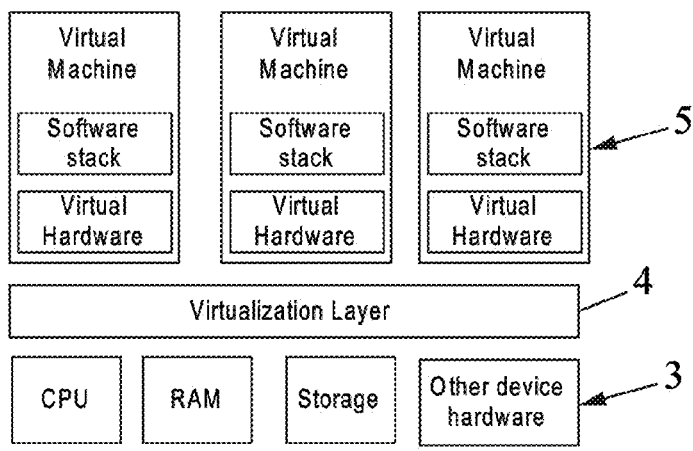
FIG. 2, already discussed, schematically shows an architecture for a communication device using hardware virtualization.

The invention relates to the operation of a communication device using hardware virtualization as mentioned in the introduction above and shown in FIG. 2.

The communication device can be any type of device, such as a laptop, a desktop PC, a mobile phone, a smartphone, a personal digital assistant, a tablet computer, a more complex device including several separate but cooperating entities, or other.

Advantageously, the communication device may communicate with at least one communication network. The communication device may be a mobile device which can be at least in part autonomous in terms of power consumption. As a non-limiting example, the communication device can be powered by means of an internal battery which can be charged from time to time by an external power supply.

Figure 3:
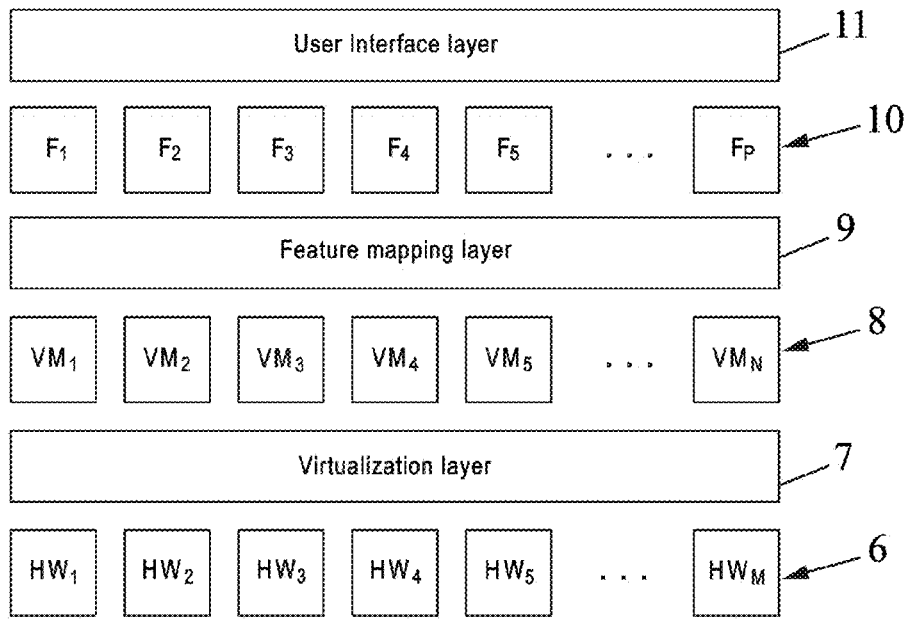
FIG. 3 schematically shows a feature-oriented architecture for a communication device that may be used in the present invention.

Such a communication device offers a plurality of features $10$, $F_1, F_2, \ldots, F_P$, by means of a plurality of virtual machines (VMs) $8$, $VM_1, VM_2, \ldots, VM_N$, which run on a virtualized representation of a plurality of hardware components (HWs) $6$, $HW_1, HW_2, \ldots, HW_M$, as shown in FIG. 3. Note that the integers P, M and N may have the same or different values with each other.

The matching between the VMs and the HWs is performed by the so-called virtualization layer $7$ which abstracts the underlying physical resources and offers a virtualized representation of them to the overlying virtual machines, while the matching of the features and the VMs is performed by the feature mapping layer $9$ in this example. A given VM $8$ may rely on one or several HWs $6$. Likewise, a feature $10$ may require the use of one or several VMs $8$. In other words, a given feature may be provided autonomously by a singular virtual machine, or a plurality of intercommunicating virtual machines may need to operate co-ordinately to provide that feature. This organization is transparent to the communication device user to whom only the information made available by the user interface layer $11$ is presented.

As a non-limiting example, the feature $F_1$ may require the use of both the virtual machines $VM_1$ and $VM_2$ which in turn rely respectively on the hardware components $HW_1$ (for $VM_1$) and $HW_2$ as well as $HW_3$ (for $VM_2$).

A limitation of the prior art mentioned in the introduction is the limited possibility to clearly identify what specific features will be no longer available to the user as a result of the shutdown of specific hardware components or virtual machines. Actually, some specific features are inherently bounded to the presence of hardware component, such as photography is related to the camera component and telephony to the 2G/3G/LTE modem. However as mentioned above with reference to FIG. 3, in many other cases, certain features may require a plurality of hardware components and software functionalities provided by a plurality of virtual machines. For instance, a navigation feature may require GPS and network connectivity for downloading maps and access to a virtual machine providing routing logic and another virtual machine providing map rendering.

In a structured approach, the invention thus provides to obtain a mapping between at least some features and corresponding sets of virtual machines and hardware components which are required to enable said features. And then, upon deciding to activate or deactivate a group of features (which may include only one feature or any number of features), virtual machines and hardware components are switched on or off depending on said mapping.

It should be noted that activating a group of features can mean, depending on the initial state of said group of features, changing its state from inactive to active or keeping its state active. Likewise, deactivating a group of features can mean, depending on the initial state of said group of features, changing its state from active to inactive or keeping its state inactive.

With respect to FIG. 3 discussed above, the mapping between the features $10$ and the VMs $8$ may be maintained in the feature mapping layer $9$, while the mapping between the features $10$ and the HWs $6$ may be derived from the combined information maintained in the feature mapping layer $9$ (for the relation between the features $10$ and the VMs $8$) and in the virtualization layer $7$ (for the relation between the VMs $8$ and the HWs $6$). Other architectures and implementations may be envisaged in addition or instead. As an example, the mapping between the features $10$ and the HWs $6$ may be directly maintained in a specific layer or memory, without the need to combine feature-VM and VM-HW mapping information.

The way in which the mapping is obtained and the form in which it is maintained can be of any suitable possibilities, some of which will be described hereafter for illustration purpose.

In a non-limiting example, obtaining said mapping comprises, with respect to at least one feature, obtaining one corresponding set of virtual machines of said plurality of virtual machines and one corresponding set of hardware components of said plurality of hardware components which are required to enable said at least one feature.

According to a first possibility described herein after with reference to FIG. 4, those two sets are commonly included in a single representation, which further shows the relations between the virtual machines and the hardware components.

For instance, a respective set e.g. in the form of tables $12$ (though many other types of representation may be used instead), $M_1, M_2, \ldots, M_P$ may be defined for each feature $10$, $F_1, F_2, \ldots, F_P$ (or at least some of them). Each table $M_K$ represents a given feature $F_K$ provided by the communication device as a whole, such as navigation, send SMS, make and receive phone calls and lookup contacts, etc. Each element $m_{ij}$ of the table $M_K$ is equal to 1 if feature $F_K$ requires virtual machine $VM_i$ and this virtual machine $VM_i$ requires hardware component $HW_j$ to provide this feature, otherwise it is equal to 0.

Note that all the tables $12$ may include a column for every virtual machine $8$ available in the communication device and/or a line for every hardware component $6$ available in the communication device, some of which being possibly empty. Alternatively, the tables $12$ may include a column for only some of the virtual machines $8$ and/or a line for only some of the hardware components $6$, such as only the ones which are actually required to enable the corresponding feature.

The tables $12$ may be loaded in a memory of the communication device in factory and/or possibly updated when the number and/or the nature of the features $10$ available changes. To that end, each time a new feature is installed on the communication device, it may be determined which virtual machines and/or hardware components it requires. This information may be provided in an installation package provided together with the feature, or it may be derived from an analysis of the feature made by the communication device itself. Any other possibility may be used as well in addition or instead, as will appear to one skilled in the art.

It is now assumed that it has been decided to activate or deactivate a group of one or several features among the features 10. This decision can have any origin or motivation. For instance, it may occur when at least one criterion is satisfied of for any other reason.

Non-limiting examples of such criterion may include any one of the following: a user input on the communication device, a remaining power level on the communication device (e.g. so as to deactivate one or several features when a residual battery autonomy downward crosses a predefined threshold or, in contrast, to activate one or several features when a residual battery autonomy upward crosses a predefined threshold or when the communication device has just been connected to an external power supply), an actual use of at least one group of features among all features 10 available (e.g. so as to deactivate one or several features which have not been used for a given time period, or in contrast, to activate one or several features which have been used at least a specified number of times over a given time period). The criterion may also be based on many other parameters as will appear to one skilled in the art. It may for instance rely on decisions heuristics that may combine several parameters, thresholds and others.

The decision to activate or deactivate a group of one or several features among the features 10 may also be based on priority levels previously assigned to at least some of the features. As a non-limiting example with regard to a phone device, core telephony features may be assigned the highest priority, since the ability of making emergency calls is a top priority in such device. So keeping the core telephony features active will be favoured, compared to other features. In contrast, deactivating other features will be done in priority compared to the core telephony features.

The priority levels can be defined in any possible way, such as by default in the communication device, by the features themselves (each group of features being associated with a predefined priority level), by the communication device user, by the operator of a communication network with which the communication device can communicate, or other. They may be assigned to the corresponding features with no consideration of the virtual machines and/or hardware components said features rely on.

Once it has been decided to activate or deactivate a group of one or several features among the features 10, corresponding virtual machines and hardware components may be switched on or off accordingly by taking account of at least one and possibly all of the above-mentioned tables 12.

Note that switching off a given hardware component relates to physically shutting down this component, while switching it on relates to physically powering it on.

In comparison, switching on a virtual machine is similar to launching an application. The virtualization layer launches a virtual machine by doing the following: allocate hardware resources for the virtual machine execution (memory segments, CPU time, etc.), and make the processor of the physical machine execute the bootstrap instructions of the virtual machine. Switching off a virtual machine consists in the following steps: make the processor of the physical machine execute the shutdown instructions of the virtual machine; alternatively, if we want to "hibernate" rather than shutdown the virtual machine, the virtualization layer takes a snapshot of the RAM content rather than executing the shutdown instructions; and deallocate all the hardware resources used by the virtual machine. As a result, the virtual machine is not usable anymore and the hardware resource can be used by other applications.

With this mode of operation, when it has been decided to deactivate a first group of at least one feature among features 10 (the other features remaining in the current state), the virtual machines and the hardware components which, according to the tables 12 (or any other mapping representation), are required to enable the features of said first group but are not required to enable the other features which are not part of said first group of features may be switched off. Advantageously, the switched off virtual machines and the hardware components may be the ones which are required to enable the features of said first group but are not required to enable the active features which are not part of said first group of features.

Figure 4:
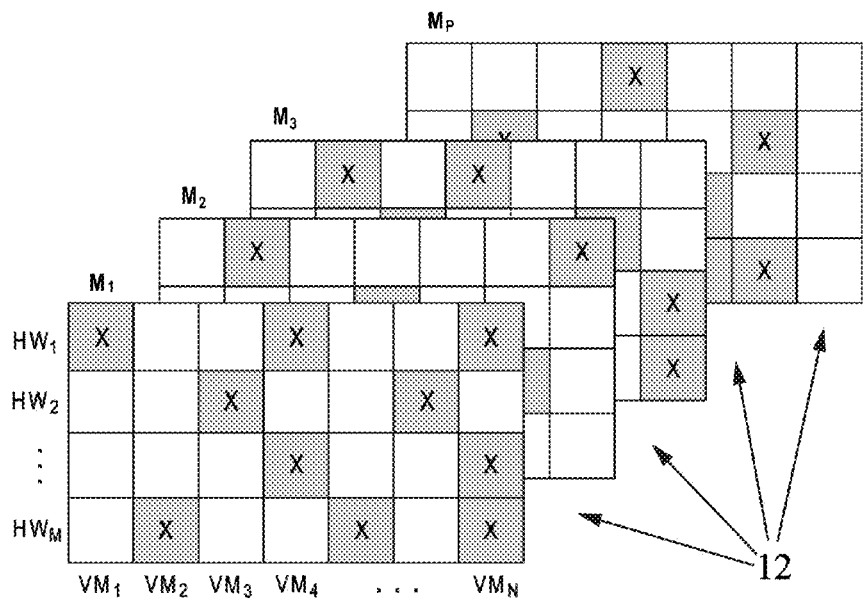
FIG. 4 schematically shows mapping tables indicating VMs/HWs relations with respect to respective features or groups of features.

With respect to the example of FIG. 4, assuming that a feature $F_i$ to be deactivated would make use of $VM_A$ and $HW_B$, the latter may be switched off provided that they would not be required by other (advantageously active) features 10 according to the corresponding tables 12.

Alternatively or in addition, when it has been decided to activate only a group of at least one feature among features 10 (the other features being inactive), the virtual machines and the hardware components which, according to the tables 12 (or any other mapping representation), are not required to enable the features of said group of features may be switched off.

With respect to the example of FIG. 4, assuming that the only feature $F_i$ which should be active would not make use of $VM_A$ and $HW_B$, the latter may be switched off.

In both cases, power consumption of the communication device is efficiently reduced by switching off unnecessary VMs and/or HWs, without affecting the mode of operation of the communication device with respect to other features. The communication device user experience is thus kept to an acceptable level.

Note that other scenarios may be envisaged in addition to or instead of the ones mentioned above, to switch on or off VMs and/or HWs depending on at least some of the tables 12 (or any other mapping representation), after it has been decided to activate or deactivate at least one group of features among all features 10 available.

Advantageously, the tables 12 mentioned above may be grouped in feature sets. For instance, the following feature sets M'={$M_1$, $M_3$, $M_7$} and/or M''={$M_2$, $M_6$, $M_8$, $M_{15}$} may be defined as subsets of the table set M={$M_1$, $M_2$, ..., $M_P$}. These feature sets represent collections of features that can be made available to a user of the communication device. For example, it could be possible to define a feature set "Core Telephony Services", comprising the following features: mobile originated calls, mobile terminated calls, SMS service and contacts.

$$F_{CORE\_TELEPHONY} = \{M_{MO\_CALLS}, M_{MT\_CALLS}, M_{SMS}, M_{CONTACTS}\}$$

From each feature set, it can be obtained the list of all virtual machines required to provide the features of the set and all the hardware components that each of those virtual machines use for the provision of said features.

As those skilled in the art would recognise, the set of virtual machines and hardware components required by the features of the feature set S can be obtained for example according to the following rule:

The virtual machine $i_0$ shall be activated if:

$$\sum_{k:\, M_k \in S} \sum_{j=1}^{N_{HW}} m_{k_{i_0 j}} \geq 1$$

and shall be deactivated otherwise.

Similarly, the hardware component $j_0$ shall be activated if:

$$\sum_{k:\, M_k \in S} \sum_{i=1}^{N_{VM}} m_{k_{ij_0}} \geq 1$$

and shall be deactivated otherwise.

According to a second possibility for the mapping representation, the set of virtual machines and the set of hardware components corresponding to one or several features may make use of separate representations, in which the relations between the virtual machines and the hardware components do not appear.

Figure 5:
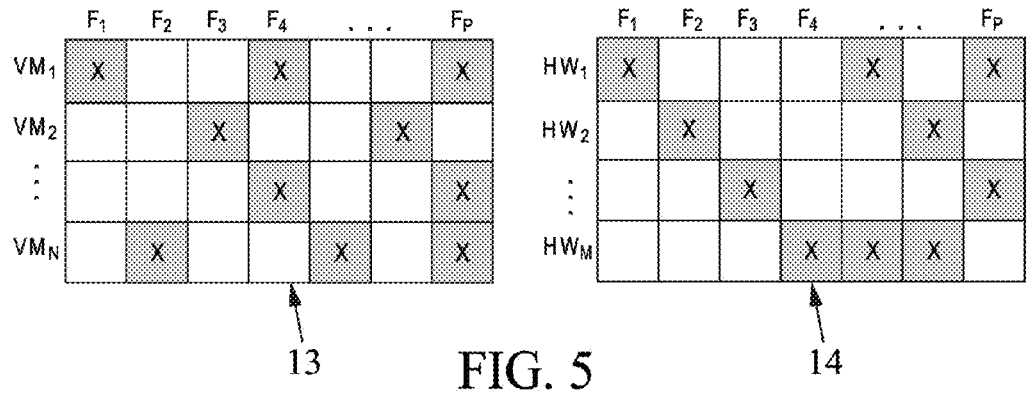
FIG. 5 schematically shows mapping tables indicating respectively VMs and HWs required by features.

This situation is illustrated in FIG. 5, where two different tables appear, here with respect to all the features 10 (although only some of the features may be addressed in the tables).

The table V 13 represents the relation between the features 10, $F_1, F_2, \ldots, F_P$, and the virtual machines 8, $VM_1$, $VM_2, \ldots, VM_N$ they each require. Each element $v_{ki}$ of this table is equal to 1 if the feature $F_k$ needs virtual machine $VM_i$ to operate, otherwise it is equal to 0.

The table H 14 represents the relation between the features 10, $F_1, F_2, \ldots, F_P$, and the hardware components 6, $HW_1, HW_2, \ldots, HW_M$ they each require. Each element $h_{kj}$ of this table is equal to 1 if the feature $F_k$ needs hardware component $HW_j$ to operate, otherwise it is equal to 0.

Advantageously, the values presented in those two tables 13 and 14 could be derived from the set F of tables $M_k$ 12 as shown in FIG. 4, e.g. through the following mathematical relations:

$$v_{ki} = \begin{cases} 1 & \sum_{j=1}^{N_{HW}} m_{k_{ij}} \geq 1 \\ 0 & \text{otherwise} \end{cases}$$

$$h_{kj} = \begin{cases} 1 & \sum_{i=1}^{N_{VM}} m_{k_{ij}} \geq 1 \\ 0 & \text{otherwise} \end{cases}$$

As result of the collapse of the table set F into tables 13 and 14, the information describing what virtual machines use what hardware components to provide what feature is lost. Nevertheless, in many cases, this information may not be required. Therefore, this collapse could be advantageously applied to improve system performance by reducing the complexity of calculations required to identify required virtual machines and hardware components in order to enable determined features.

Note however that the tables 13 and 14 may be obtained in a different manner, i.e. without making use of the set F of tables $M_k$ 12. As a non-limiting example, they may be loaded in a memory of the communication device in factory and/or possibly updated when the number and/or the nature of the features 10 available changes. To that end, each time a new feature is installed on the communication device, it may be determined which virtual machines and/or hardware components it requires. This information may be provided in an installation package provided together with the feature, or it may be derived from an analysis of the feature made by the communication device itself. Any other possibility may be used as well in addition or instead, as will appear to one skilled in the art.

For illustration purpose, assuming that the decision has been made to activate only features $F_3$ and $F_4$, the other features 10 being inactive, the subsequent operations may be carried out by using tables 13 and 14.

An analysis of table 13 shows that the virtual machine $VM_N$ is not required by features $F_3$ and $F_4$. Likewise, an analysis of table 14 shows that the hardware components $HW_1$ and $HW_2$ are not required by features $F_3$ and $F_4$. So $VM_N$, $HW_1$ and $HW_2$ can be deactivated irrespective of whether or not they may be related to each other, and with no side-effect on the operation of the communication device. Power consumption can thus be saved for the communication device.

Rather than analyzing the mapping tables 12, 13 and/or 14 in order to make a decision as to switching on or off virtual machines and hardware components, the following operations, described with reference to FIG. 6, may be carried out.

A current state table 16 is obtained by the communication device. This current state table 16 represents a current on or off state of all available virtual machines 8 and hardware components 6.

Figure 6:
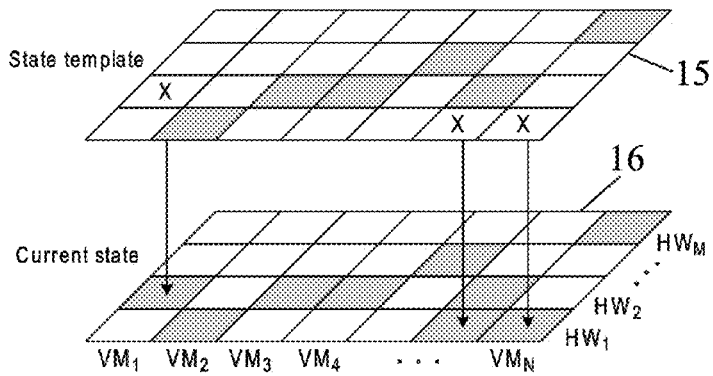
FIG. 6 schematically shows a "masking" embodiment to update a current state situation for the VMs and HWs.

In the example shown in FIG. 6, the relations between the virtual machines and the hardware components appear. However, like for tables 13 and 14 mentioned above, separate tables may be used instead with respect to the virtual machines and the hardware components respectively, with no relation therebetween.

In the example of FIG. 6, the grey cells of table 16 show the couples virtual machines—hardware components which are currently active ('on' state) on the communication device. In contrast, the transparent cells of table 16 show the couples virtual machines—hardware components which are currently inactive ('off' state) on the communication device. In other words, a given virtual machine is currently active if the corresponding column in the current state table 16 includes at least one grey cell and a given hardware component is currently active if the corresponding line in the current state table 16 includes at least one grey cell.

Upon deciding to activate or deactivate at least one group of features (i.e. one or several features), a state template 15 or "mask" is built. This state template 15 is derived from the mapping mentioned above (e.g. from table 12, 13, 14, and/or other). It represents a target on or off state of all the virtual machines 8 and all the hardware components 6.

As a non-limiting example, if it is decided to activate features $F_1$ and $F_2$ only, the state template 15 may be built by combining the tables 12 respectively related to those features. Thus each grey cell in any one of the two tables 12 of features $F_1$ and $F_2$ will result in a corresponding grey cell in the state template 15, the other cells being kept transparent.

Then, a comparison is made between the current state table 16 and the state template 15. As a result of this comparison, the state of the virtual machines and the hardware components is modified so that the current state table 16 becomes in accordance with the target states shown in the state template 15.

In other words, after comparing the tables 15 and 16, hardware components and virtual machines can be switched on/off in order to make the current state table 16 representing the running virtual machines and hardware components equal to the "masking" state template table 15.

In the illustrative example shown in FIG. 6, there are three differences between the target states shown in the state template table 15 and the current states shown in the current state table 16, which are marked with crosses. Those differences relate respectively to the couples ($VM_1$, $HW_2$), ($VM_{N-1}$, $HW_1$) and ($VM_N$, $HW_1$). As a result of the identification of those differences, the virtual machine $VM_1$ may be switched off, as it is not involved by any still active hardware component. In contrast, the virtual machines $VM_{N-1}$ and $VM_N$ may be kept active, as they are involved by still active hardware components, namely $HW_2$ and $HW_M$ respectively. Likewise, the hardware components $HW_1$ and $HW_2$ may be kept active, since they are required for still active virtual machines to operate.

Other switch on/off decisions may be made from the comparison between the current state table 16 and the state template 15, as will appear to one skilled in the art. For instance, the virtual machines $VM_1$, $VM_{N-1}$ and $VM_N$, as well as the hardware components $HW_1$ and $HW_2$ may all be switched off as a result of the above-mentioned differences between the two tables, irrespective of whether those virtual machines and hardware components may be required for other virtual machines and/or hardware components.

Note that all other aspects described above with respect to the representation mode of FIG. 4 (e.g. in relation to the decision making to activate or deactivate a group of at least one feature, the used criteria, the collection of several features, etc.) may still apply with respect to the representation modes of FIG. 5, FIG. 6 or any other possible representation mode.

All or part of the operations described above can be carried out by appropriate units of the communication device itself.

At least some of them can be implemented by means of a computer program product comprising appropriate code instructions and capable of being loaded and run on the communication device.

Figure 7:
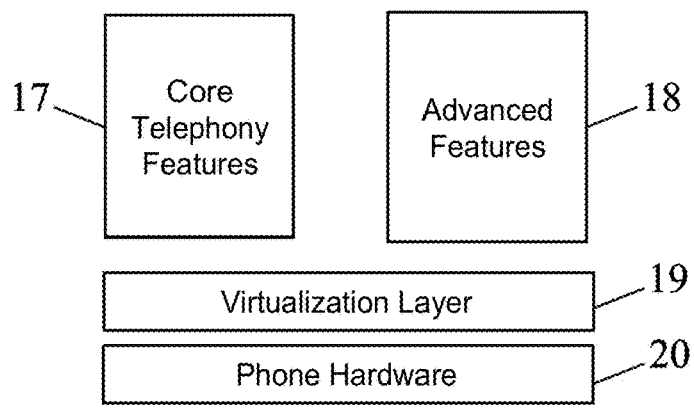
FIGS. 7 to 9 schematically show an exemplary functional architecture for a communication device at successive points in time.
Figure 8:
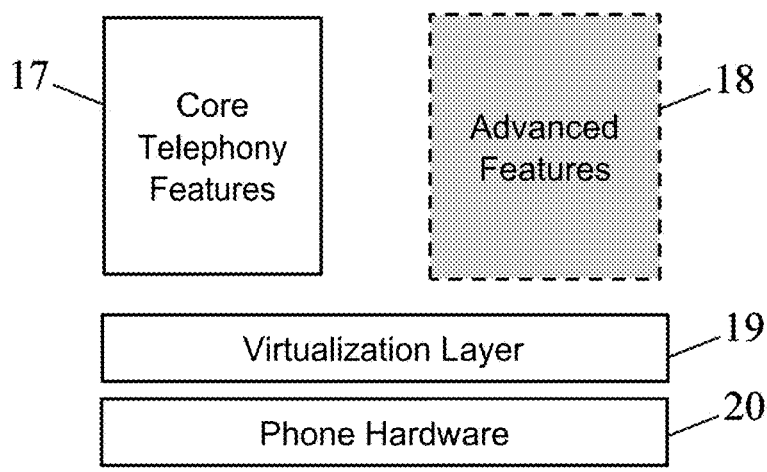
Figure 9:
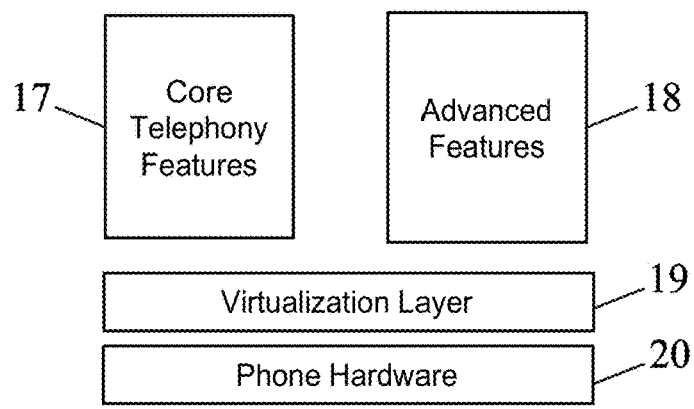

A use case will now be described for illustration purpose with reference to FIGS. 7 to 9. It should not be construed to limit the scope of the present invention.

In this use case scenario, a mobile device (e.g. a smartphone) is equipped with a virtualization layer 19 providing features. The totality of the features of this device features are defined in two state templates, which are:

$S_{CORE\_TELEPHONY}$: it comprises all the Core Telephony Features such as voice calls, SMS messaging and address book lookup (Core telephony features 17); and $S_{ADVANCED\_FEATURES}$: it comprises all the Advanced Features provided by the smartphone apart from core telephony, such as web browsing, email, multimedia and gaming (Advanced features 18).

The device entire feature set can be represented as a set F, where:

$$F = \{S_{CORE\_TELEPHONY}, S_{ADVANCED\_FEATURES}\}$$

$$\begin{cases} F = S_{CORE\_TELEPHONY} \cup S_{ADVANCED\_FEATURES} \\ S_{CORE\_TELEPHONY} \cap S_{ADVANCED\_FEATURES} = \emptyset \end{cases}$$

In this specific case, the parameter upon which feature activation/deactivation decisions are made is the residual battery autonomy. More specifically:

If residual battery life descends below 10% of maximum battery life, advanced features are deactivated;

If the mobile device is in a state where residual battery life is above 10% and/or it is supplied with an external power source, the advanced features are reactivated.

It is assumed that the device is fully charged initially. Both feature sets are up and running on the device, and the user can access the full range of features 17-18, as shown in FIG. 7.

At some point in time, the battery level of the device downward reaches 10%, and the Advanced Features 18 are disabled. The user could be asked for confirmation before proceeding. To execute this operation, the virtualization layer 19 compares the table representing currently running virtual machines and hardware components with the core telephony features template and identifies all currently running hardware components and virtual machines that are not needed by core telephony features 17. After this step, identified hardware components are shut down and virtual machines are hibernated. The hibernation of virtual machines allows to release all physical resources they were using and to save their current state in order to be restored at a later stage without any loss of data.

From now on, the user of the device can only access the Core Telephony Features 17. Unnecessary resources among the hardware components 20 (e.g. Wi-Fi and GPS) are switched off and others (e.g. CPU and RAM) are throttled to match the defined resources linked to this state, as shown in FIG. 8.

It is now assumed that the device is no longer affected by residual battery autonomy shortage (battery level is sufficient and/or device is supplied with external power source). A reactivation is carried out by comparing the table of currently active virtual machines and hardware components with the advanced features state template. The virtualization layer 19 identifies all the virtual machines and hardware components 20 required by the advanced features 18 which are currently inactive and operates on them to switch them on. After this operation, the Advanced Features state is restored and the user has again access to all its features in the same conditions as before the feature deactivation, as shown in FIG. 9.

Many other use case scenarios may be envisaged within the framework of the present invention, as will appear to one skilled in the art.

We claim:

1. A method of operating a communication device offering a plurality of features by a plurality of virtual machines, which run on a virtualized representation of a plurality of hardware components, the method comprising:

storing at least one table associated with the communication device, the at least one table comprising, for each of the plurality of features, a mapping between that feature and a corresponding set of virtual machines of said plurality of virtual machines and a corresponding set of hardware components of said plurality of hardware components that are required to enable the corresponding feature, said mapping comprising common sets of both virtual machines and hardware components including relations therebetween or separate sets of virtual machines and hardware components, wherein, for at least one feature of the plurality of features, said corresponding set of hardware components contains at least two hardware components, and wherein, for at least one feature of the plurality of features, said corresponding set of virtual machines contains at least two virtual machines;
a first step of deciding to activate a first group of features of the plurality of features and to deactivate a second group of features of the plurality of features that are not in the first group; and
a second, subsequent step of switching on or off virtual machines of said plurality of virtual machines and hardware components of said plurality of hardware components on said device depending on said at least one table, comprising:
switching on the virtual machines of said plurality of virtual machines and the hardware components of said plurality of hardware components which, according to the at least one table, are required to enable the features of said first group of features; and
switching off the virtual machines of said plurality of virtual machines and the hardware components of said plurality of hardware components which, according to the at least one table, are required to enable the features of said second group of features but are not required to enable the features of said first group of features.

2. The method as claimed in claim 1, wherein deciding to activate or deactivate at least one group of features of said plurality of features occurs when at least one criterion is satisfied.

3. The method as claimed in claim 2, wherein said criterion is based on at least one of: a user input on the communication device, a remaining power level on the communication device, an actual use of at least one group of features of said plurality of features.

4. The method as claimed in claim 1, further comprising:
obtaining a current state table representing a current on or off state of all virtual machines of said plurality of virtual machines and all hardware components of said plurality of hardware components; upon deciding to activate or deactivate at least one group of features of said plurality of features, deriving from said mapping a state template representing a target on or off state of all the virtual machines of said plurality of virtual machines and all the hardware components of said plurality of hardware components; and
switching on or off virtual machines of said plurality of virtual machines and hardware components of said plurality of hardware components depending on a comparison between the current state table and the state template.

5. A communication device comprising:
a plurality of hardware components;
a plurality of virtual machines configured to offer a plurality of features and which run on a virtualized representation of the plurality of hardware components;
a storage medium comprising at least one table stored thereon comprising, for each of the plurality of features, a mapping between that feature and a corresponding set of virtual machines of said plurality of virtual machines and a corresponding set of hardware components of said plurality of hardware components that are required to enable the corresponding feature, said mapping comprising common sets of both virtual machines and hardware components including relations therebetween or separate sets of virtual machines and hardware components,
wherein, for at least one feature of the plurality of features, said corresponding set of hardware components contains at least two hardware components, and
wherein, for at least one feature of the plurality of features, said corresponding set of virtual machines contains at least two virtual machines; and
a unit configured to decide to activate a first group of features of the plurality of features and to deactivate a second group of features of the plurality of features that are not in the first group, and subsequently to switch on or off virtual machines of said plurality of virtual machines and hardware components of said plurality of hardware components depending on said at least one table, comprising:
switching on the virtual machines of said plurality of virtual machines and the hardware components of said plurality of hardware components which, according to the at least one table, are required to enable the features of said first group of features; and
switching off the virtual machines of said plurality of virtual machines and the hardware components of said plurality of hardware components which, according to the at least one table, are required to enable the features of said second group of features but are not required to enable the features of said first group of features.

6. A non-transitory computer-readable medium comprising a computer program product stored thereon and comprising code instructions for operating a communication device offering a plurality of features by a plurality of virtual machines which run on a virtualized representation of a plurality of hardware components, when loaded and run on said communication device, wherein the instructions comprise:
instructions configured to store at least one table associated with the communication device comprising, for each of the plurality of features, a mapping between that feature and a corresponding set of virtual machines of said plurality of virtual machines and a corresponding set of hardware components of said plurality of hardware components that are required to enable the corresponding feature, said mapping comprising common sets of both virtual machines and hardware components including relations therebetween or separate sets of virtual machines and hardware components,
wherein, for at least one feature of the plurality of features, said corresponding set of hardware components contains at least two hardware components, and
wherein, for at least one feature of the plurality of features, said corresponding set of virtual machines contains at least two virtual machines; and
instructions configured to, decide to activate a first group of features of the plurality of features and to deactivate a second group of features of the plurality of features that are not in the first group, and then subsequently to switch on or off virtual machines of said plurality of virtual machines and hardware components of said plurality of hardware components on said device depending on said at least one table, comprising:
switching on the virtual machines of said plurality of virtual machines and the hardware components of said plurality of hardware components which, according to the at least one table, are required to enable the features of said first group of features; and switching off the virtual machines of said plurality of virtual machines and the hardware components of said plurality of hardware components which, according to the at least one table, are required to enable the features of said second group of features but are not required to enable the features of said first group of features.

\* \* \* \* \*